United States Patent [19]

Stolz

[11] Patent Number: 4,681,359

[45] Date of Patent: Jul. 21, 1987

[54] BELT GRIPPING DEVICE

[75] Inventor: Hermann Stolz, Mühlheim, Fed. Rep. of Germany

[73] Assignee: MATO Maschinen- und Metallwarenfabrik Curt Matthaei GmbH & Co. KG., Offenbach, Fed. Rep. of Germany

[21] Appl. No.: 855,903

[22] Filed: Apr. 24, 1986

[30] Foreign Application Priority Data

May 6, 1985 [DE] Fed. Rep. of Germany ....... 3516161

[51] Int. Cl.⁴ .................... B25B 25/00; B66F 19/00
[52] U.S. Cl. .................... 294/81.21; 254/199; 294/81.61; 294/104; 294/132
[58] Field of Search .............. 294/1.1, 85, 81.1–81.21, 294/81.6–81.62, 86.4, 103.1, 101, 104, 106, 111–114, 132–136, 901; 254/199, 250, 251, 253

[56] References Cited

U.S. PATENT DOCUMENTS

| | | | |
|---|---|---|---|
| 1,031,115 | 7/1912 | Hanson | 294/81.2 X |
| 1,084,899 | 1/1914 | Prosser | 294/132 |
| 2,412,555 | 12/1946 | Baker | 294/81.61 X |
| 3,154,340 | 10/1964 | Lowell | 294/104 |
| 4,340,206 | 7/1982 | McJunkin | 294/104 X |
| 4,462,626 | 7/1984 | Heidemann | 294/133 X |
| 4,500,127 | 2/1985 | Van Derlin | 294/132 X |

FOREIGN PATENT DOCUMENTS

| | | |
|---|---|---|
| 56060 | 10/1912 | Austria . |
| 527277 | 6/1931 | Fed. Rep. of Germany . |
| 712994 | 10/1941 | Fed. Rep. of Germany . |
| 1064303 | 8/1961 | Fed. Rep. of Germany . |
| 1195919 | 7/1965 | Fed. Rep. of Germany ... 294/81.61 |
| 7231402 | 5/1973 | Fed. Rep. of Germany . |
| 2301571 | 8/1973 | Fed. Rep. of Germany ..... 294/81.1 |
| 2237651 | 2/1974 | Fed. Rep. of Germany . |
| 3322562 | 8/1984 | Fed. Rep. of Germany . |
| 621291 | 4/1949 | United Kingdom . |
| 1397075 | 6/1975 | United Kingdom ................. 294/85 |
| 1516297 | 7/1978 | United Kingdom ............. 294/81.61 |

Primary Examiner—Johnny D. Cherry
Attorney, Agent, or Firm—W. G. Fasse; D. H. Kane, Jr.

[57] ABSTRACT

A belt gripping device is constructed for grasping a length of conveyor belt by the use of clamping surfaces adapted to engage upper and lower faces of the belt and with pivoting clamping elements. The clamping surfaces are located clear of the middle of the belt and a transverse, telescoping connecting element is used to maintain the pivoting clamping elements at an adjustable distance from each other.

12 Claims, 8 Drawing Figures

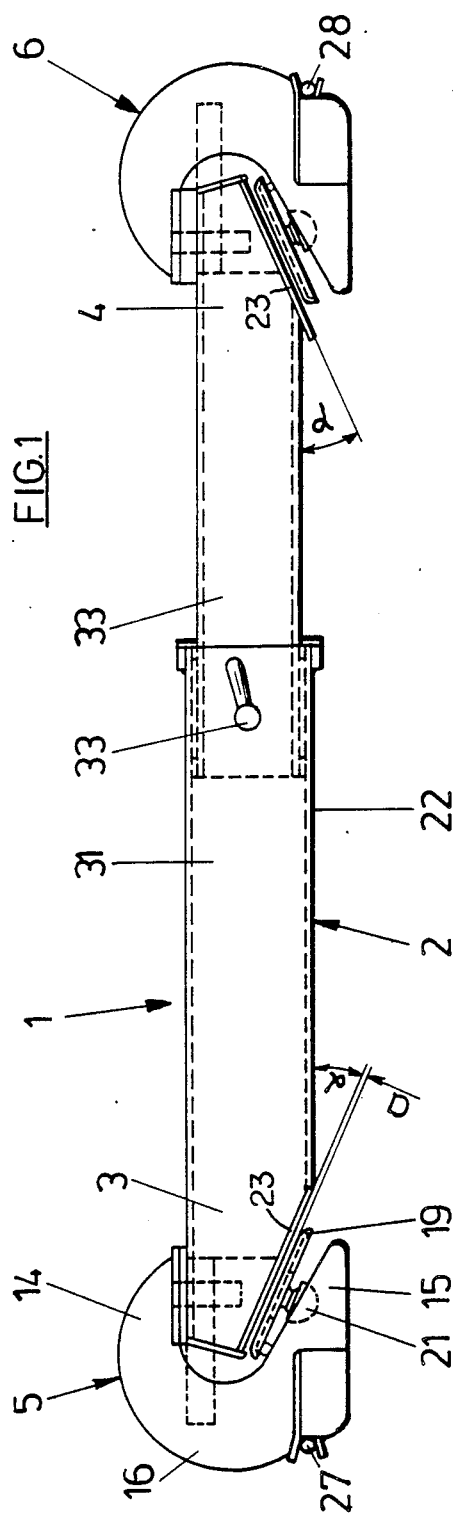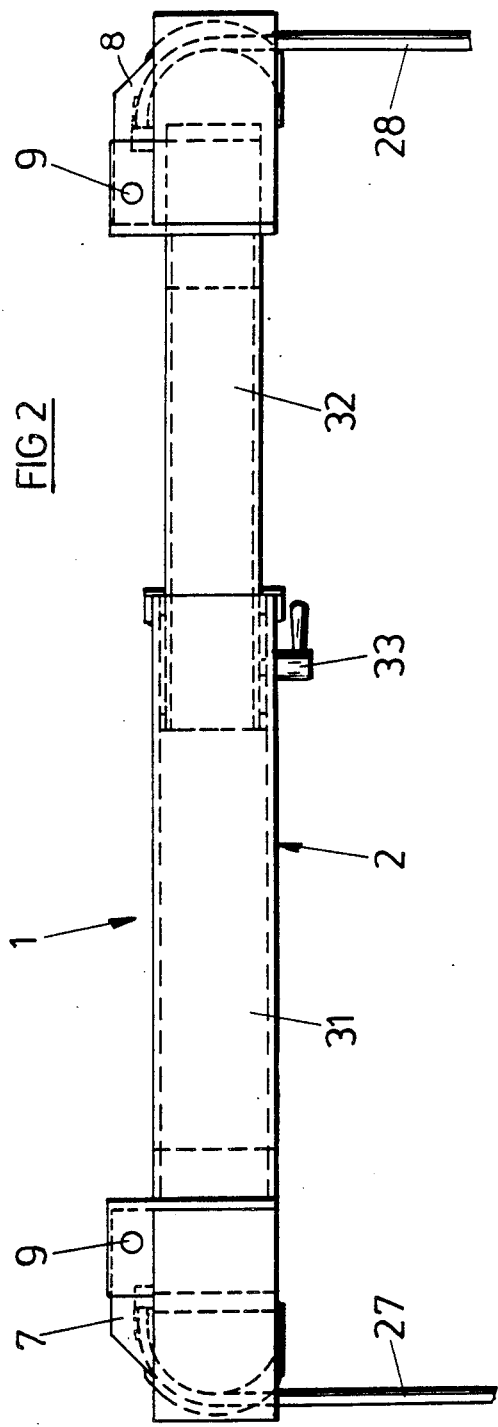

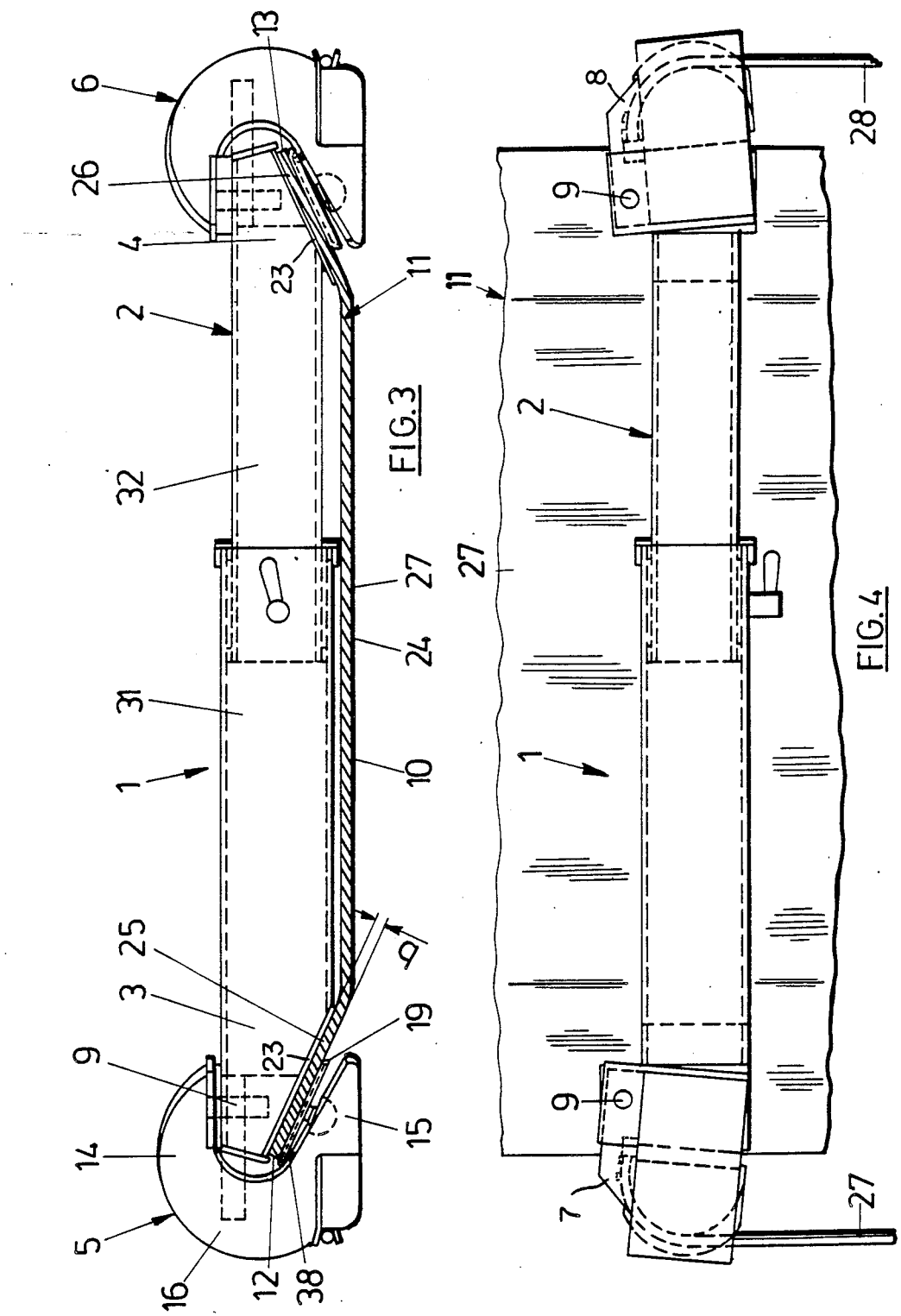

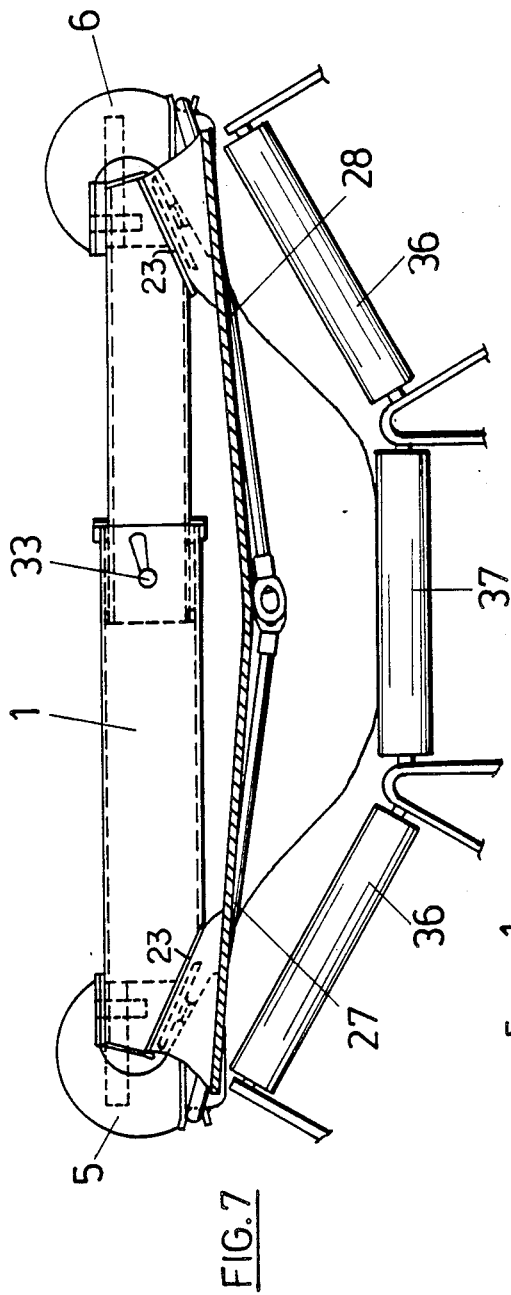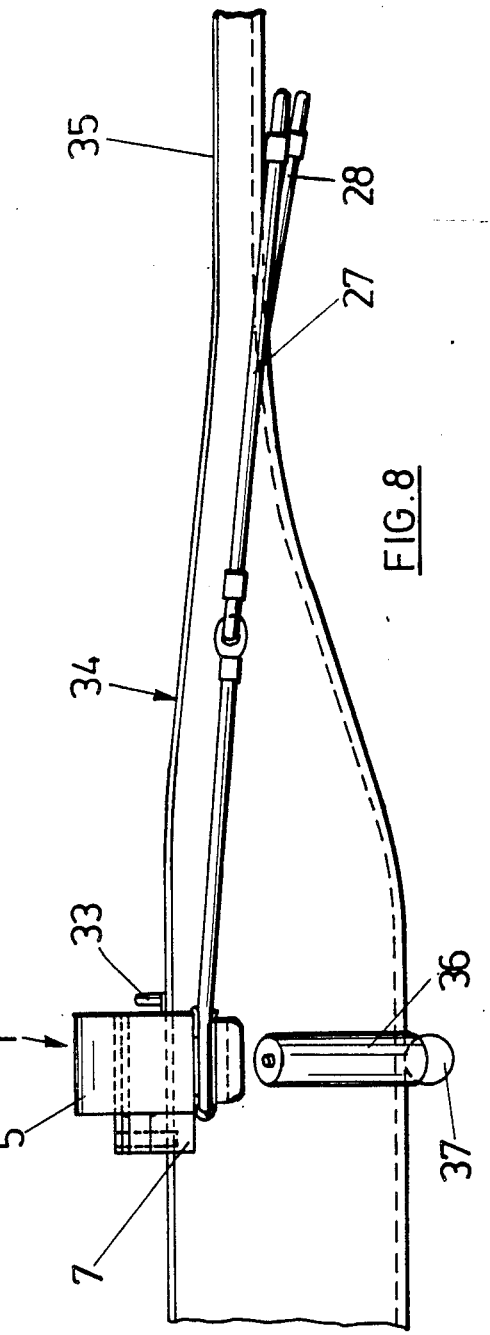

BELT GRIPPING DEVICE

BACKGROUND OF THE INVENTION

The invention relates to a gripping device intended for conveyor belts, with gripping faces for engaging the upper and lower sides of the belt and with pivotally mounted holding elements.

Belt gripping devices of this type have long been available and are shown and described for example in the German Patent Publication No. 2,237,651, the German Pat. No. 1,064,303 and the German Utility Model No. 7,231,402. Such belt gripping devices serve to draw in and hold the conveyor belting and to tension its ends when such belt ends are to be joined together. Features of the prior art belt gripping devices involve the use of two clamping bars between which the end of the belt is placed and that the clamping force is produced with the aid of tension ropes which act on clamping elements and move the clamping bars by means of inclined planes or screws, or by means of a lever arrangement, in such a manner that the end of the conveyor belt engaged thereby is securely and powerfully held between the clamping bars as they are moved together.

Modern conveyor belts are very robust and are made in long lengths. Some conveying systems as used for example in mines use a very high driving power so that generally very large tension forces have to be applied to the conveyor belt when it is tensioned. Furthermore, particular difficulties occur if a conveyor belt held with a belt gripping device has substantial edge wear so that it no longer has the rated width. When gripping such conveyor belts the clamping bars of the belt gripping device are subjected to very high bending moments around the edges of the belt so that the transmission of force departs from the desired values and there will be a tendency for the belt gripping device to slip at the end of the conveyor belt and damage the belt.

SUMMARY OF THE INVENTION

Accordingly one object of the present invention is to devise a belt gripping device of the type described which is suited for the transfer of maximum tensile stresses for pulling belt ends toward each other.

A further purpose of the invention is to provide such a gripping device which is suitable for use with worn belting or with lengths of belting having different widths.

In order to achieve these or other aims appearing from the present specification, in the invention the gripping surfaces are placed outside the middle zone of the conveyor belt and a connecting element holds the rocking or tiltable clamping elements at an adjustable distance from each other.

The clamping surfaces located at some distance outside the middle of the conveyor belt preferably only engage the conveyor belt in a defined edge zone of the two edges and may be set to the actual width of the conveyor belt by means of the adjustable connecting element.

Due to these features, the presence of lengths of belt with different widths and with worn edges no longer gives rise to problems and has no effect whatsoever on the efficacy of the belt gripping device, since in every case it is assured that the clamping surfaces come into engagement in the desired zone of the belt edge for transmitting the required tension forces to the belt.

As part of a further development of the invention the clamping surfaces are on the one hand on the lower side of the connecting element of adjustable lengths and on the other hand on clamping members, which are tiltably mounted on the clamping elements. This feature of the invention furthermore ensures that the clamping surfaces automatically adjust themselves to the correct position for the transmission of the forces.

The connecting element is preferably a telescoping bar having ends carrying the clamping elements and the length of the telescoping bar may be varied to adjust the distance of the clamping surfaces or of the tiltable clamping elements to the belt width.

Further features of the invention will be seen from the description and the claims when read in conjunction with the drawing. The invention will now be described with reference to one working example, that is shown in the accompanying drawings.

BRIEF DESCRIPTION OF THE DRAWINGS

FIG. 1 is a side view of the belt gripping device, wherein the belt, not shown, extends perpendicularly to the plane of the drawing sheet;

FIG. 2 is a top plan view of FIG. 1 with the belt, not shown, extending substantially in the plane of the drawing sheet;

FIG. 3 is a sectional view through FIG. 1 with a lengths of conveying belt inserted into the device;

FIG. 4 is a top plan view of the belt gripping device with the conveying belt as inserted in FIG. 3;

FIG. 7 is an end-on view of the belt gripping device when drawing in a length of conveyor belt; and FIG. 8 is a side view of the belt gripping device during draw-in of a belt.

DETAILED DESCRIPTION OF A PREFERRED EXAMPLE EMBODIMENT OF THE INVENTION

Figure 6:
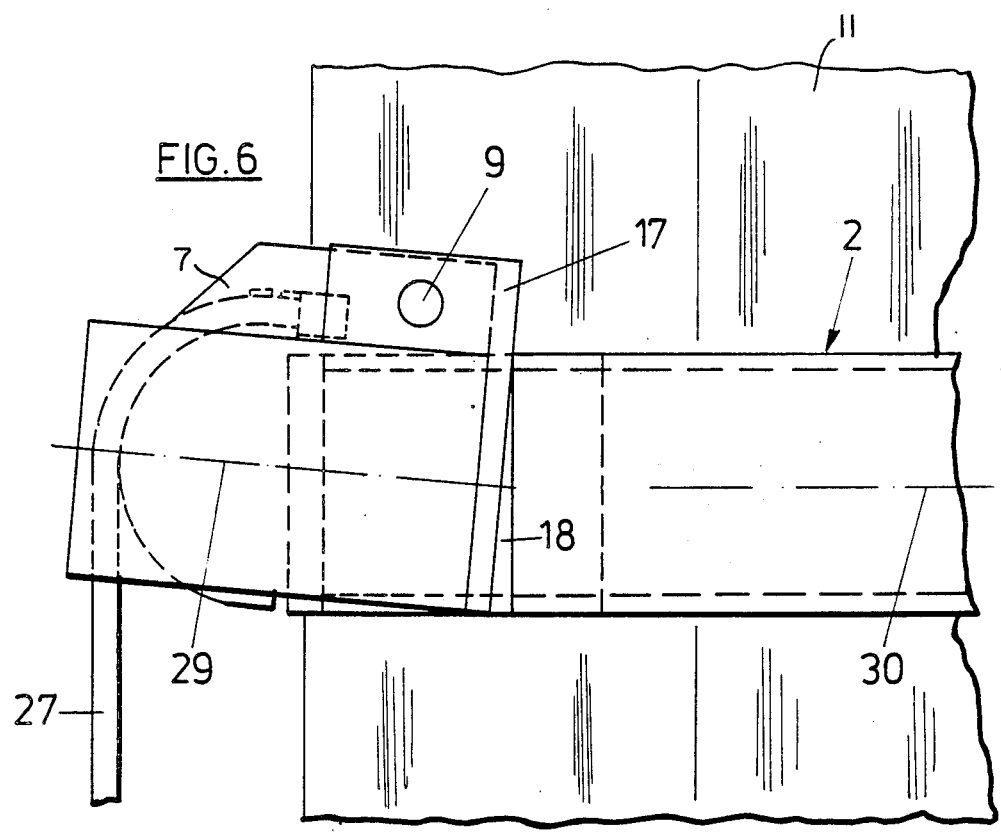
FIG. 6 is a top plan view of the detail shown in FIG. 5.

A belt gripping device 1 comprises a bar-like connecting element 2 with clamping elements 5 and 6 which are pivotally or tiltably mounted and which are basically mirror symmetrical relative to each other. The clamping elements 5 and 6 are mounted on the single telescoping bar type element 2 by bearing brackets 7 and 8 shown in FIGS. 2 and 4 and journal pins 9 extending perpendicularly to the principal plane 10 of the conveying belt 11. Each journal pin 9 is furthermore located within the width of the conveyor belt to the side of the connection element 2 as may be gathered from the views of FIGS. 2, 4 and 6. The bearing brackets 7 and 8 carrying the journal pins therefore stand somewhat out to the side of the connecting element 2.

Figure 5:
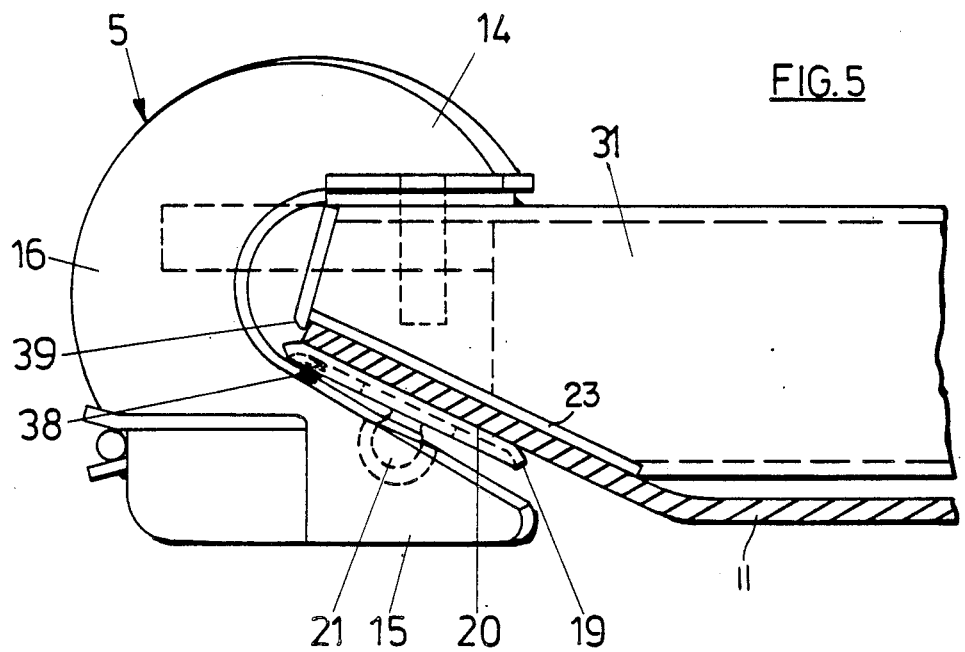
FIG. 5 shows a detailed side view of the device, namely one end of the belt gripping device, on a larger scale.

Each of the clamping elements 5 and 6 includes a bracket having a U-type or C-type configuration, as may be seen from FIGS. 1, 3 and 5, for fitting or gripping around the edges 12 and 13 of the conveyor belt 11.

Each clamping element 5 and 6 is made of an upper limb 14, a lower limb 15 and a body 16 connecting the limbs. The upper limb 14 carries a bearer plate 17 on its inner side resting on top of a support plate 18 forming part of the connecting element 2. The journal pin 9 connects these two parts pivotally with each other.

On the inside of the lower limb 15, each clamping element 5 and 6 has a clamping member 19 with a clamping surface 20. The clamping member 19 forms a rocking plate which is mounted by a ball head 21 received in a socket in the lower limb 15 so that the rocking plate is freely moving.

Each clamping element 5 and 6 is provided with such a rocking plate 19. In the clamping or holding position as shown in FIG. 1, the clamping member or rocking plate 19 is at an angle α to the main plane 10 of the conveyor belt 11 and therefore also to the plane of the connecting element 2.

On its lower side 22 the connecting element 2 also has clamping surfaces 23 extending at the same angle α to a plane parallel to the belt and which rise in an outward direction. These clamping surfaces 23 cooperate with the clamping surfaces 20 on the clamping elements 5 and 6. In this respect the clamping surfaces 20 of the clamping elements 5 and 6 contact the lower side 24 of the conveyor belt 11, whereas the clamping surfaces 23 of the connecting element 2 contact the top of the conveyor belt 11.

The contact between the belt and the clamping surfaces 20 and 23 of the two clamping elements 5 and 6 and of the connecting element 2 is exclusively in the edge area 25 and 26 of the conveyor belt 11, that is, outside of the middle 27 of the belt. These edge areas 25 and 26 are comparatively narrow in relation to the overall width of the conveyor belt 11.

In order to rock or tilt clamping elements 5 and 6 about their journal pins 9 and therefore for tensioning or clamping the conveyor belt 11, use is made of cables 27 and 28 attached to the lower limb 15 of the clamping elements 5 and 6 and curved around the clamping elements for a certain distance. Prior to tightening the cables 27 and 28 the clamping elements 5 and 6 assume the position shown in FIGS. 3, 4, and 6, wherein the clamping elements are still somewhat opened and the principal plane 29 is at a small angle to the longitudinal axis 30 of the connecting element 2, see FIG. 6. The clamping surfaces 20 and 23 accordingly are still spaced at a distance "b" from each other as shown in FIGS. 3 and 5. It is only after fully tightening the cables 27 and 28 that the clamping elements 5 and 6 pivot into their closed clamping position in accordance with FIGS. 1 and 2, whereby the distance between the clamping surface 20 on the clamping member 19 and the clamping surface 23 on the lower side 22 of the connecting element 2 is equal to "a". This distance "a" is less than the thickness of the material of the conveyor belt 11.

For setting the distance between the journalling clamping elements 5 and 6 to a desired value, the connecting element 2 may be adjusted in length. For this purpose the connecting element 2 takes the form of a hollow section and is made up of two telescoping bar members 31 and 32 that are not able to turn in relation to each other but may be varied in their overall length in a stepless manner and may be locked at the desired overall length after adjustment by the use of a clamping screw 33, for example.

The bar members 31 and 32 are preferably in the form of a rectangular box section and are freely slidable relative to each other.

FIGS. 7 and 8 show diagrammatically a particularly expedient way of drawing a piece 34 of a conveyor belt into a conveyor system with the aid of a belt gripping device 1. The belt gripping device 1 is for this purpose adjusted to a width which is less than the width of the conveyor belt so that the edges 12 and 13 of the conveyor belt 11 placed in the belt gripping device 1 are displaced towards each other to a greater extent than during operation of the conveyor system. Furthermore, the cables 27 and 28 running to the clamping elements 5 and 6 are located under the end 35 of the conveyor belt 11. The belt end 35 thus rests on the cables 27 and 28 and is supported by the cables. Thus, there is no danger of the belt gripping device 1 colliding with belt support rollers 36 when moving through the conveying system. Due to the deep troughed form of the end 35 of the conveyor belt, the piece 34 only rests with its center part on the lower belt support roller 37 and therefore practically does not make contact with the side conveyor belt rollers 36.

Spring 38 shown in FIG. 5 may be connected with the clamping member 19 so as to continuously urge the clamping member into the "open" position. Furthermore, it is possible to have a respective stop 39 on the ends of the bar members 31 and 32 to serve as an abutment for the belt edges.

Each clamping element 5, 6 is a rocking or tiltable component which is extremely resistant to bending forces and when connected with the connecting element 2, each clamping element 5, 6 makes possible a very simple and speedy assembly. Only one person is needed to carry out such assembly and he may keep to one side of the belt.

The adjustability of the connecting element 2 in conjunction with the pivoting clamping members on the underside guarantee a secure and well defined clamping surface over the whole load range and such clamping surface will even be effective in the case of damaged cover plates or cover plates with different thicknesses and it will still be effective even if the clamping elements 5 and 6 yield elastically.

What I claim is:

1. An apparatus for pulling an end of a conveyor belt having a given belt width, longitudinal belt edges, and a central zone between said belt edges, into a desired position, comprising cross bar means extending across said belt width, said cross bar means having at least two bar elements adjustable axially in their position relative to each other for adjusting said cross bar means to a desired length relative to said given belt width, and means for securing said bar elements to each other in an adjusted position, a clamping device (5, 6) for clamping each belt edge outside said central zone, means (9) for journalling each clamping device to an outer end of said cross bar means, each clamping device comprising a first clamping element having a clamping surface (23) for contacting one belt surface zone along said belt edges, and a second clamping element (19) having a further clamping surface (20) for contacting an opposite belt surface zone along said belt edges, whereby a contact by said apparatus of said conveyor belt end and of said central belt zone is substantially avoided.

2. The apparatus of claim 1, wherein said first clamping element is a fixed portion of said cross bar means, said fixed portion providing said first mentioned clamping surface in a position for contacting an upper belt surface zone along said belt edges, wherein said second clamping element comprises a movable clamping element, each clamping device further comprising pivot means (21) for tiltably mounting said second movable clamping element (19) to said clamping device, said movable clamping element providing said further clamping surface in a position for contacting a lower belt surface zone along said belt edges substantially opposite said upper belt surface zone.

3. The apparatus of claim 2, wherein said pivot means comprise a a ball and socket joint for mounting said second clamping element.

4. The apparatus of claim 1, wherein said means (9) for journalling comprise a journal pin located within said given belt width for permitting a journalling movement of said clamping device.

5. The apparatus of claim 4, wherein said journalling pin has a longitudinal axis extending substantially perpendicularly to a main plane defined by said belt, said journalling pin being located to one side of a longitudinal axis of said cross bar means.

6. The apparatus of claim 1, wherein each clamping device comprises a bracket for holding at least one of said clamping elements, said bracket having a C-type configuration for reaching around said belt edges.

7. The apparatus of claim 1, wherein each clamping device comprises a bracket for holding at least one of said clamping elements, said bracket having a C-type configuration for reaching around said belt edges and around said outer ends of said cross bar means.

8. The apparatus of claim 1, wherein said clamping surface and said further clamping surface extend at an angle relative to a main plane defined by said belt, and thus at an angle relative to the length of said cross bar means.

9. The apparatus of claim 1, wherein said first clamping element comprises a downwardly facing fixed surface portion (23) on said cross bar means, and wherein said second clamping element comprises an upwardly facing movable surface portion located substantially opposite of said fixed surface portion.

10. The apparatus of claim 1, further comprising tension stress applying means (27, 28) connected to said clamping devices for pulling said belt in a longitudinal direction of said belt.

11. The apparatus of claim 1, wherein each clamping device comprises a bracket having a C-configuration with an upper arm and a lower arm, journal means (9) for journalling said upper arm to an end of said cross bar means, and pivot means (21) for pivoting said second clamping element (19) to said lower arm of said bracket substantially opposite said first clamping element formed by a surface portion of an end of said cross bar means, said journal means (9) and said pivot means (21) allowing a proper positioning of said clamping surfaces relative to said belt edges.

12. A method for pulling an end of a conveyor belt having upper and lower belt surfaces, a given belt width, longitudinal belt edges and a central zone between said belt edges, into a desired position, comprising the following steps:
  (a) gripping each of said belt edges with clamping devices outside said central zone for leaving said central zone unobstructed,
  (b) displacing said belt edges in directions toward each other for forming said belt into a troughed form, and
  (c) applying a tension force to each of said clamping devices in a longitudinal belt direction by means of tension force transmitting members extending to each gripping device under said lower surface of said conveyor belt for supporting the belt.

* * * * *